United States Patent Office 3,663,544
Patented May 16, 1972

---

3,663,544
NOVEL PHOSPHORIC ACID AMIDE ESTERS
Karlheinz Milzner, Basel, and Fritz Reisser, Therwil, Basel-Land, Switzerland, assignors to Sandoz Ltd. (also known as Sandoz AG), Basel, Switzerland
No Drawing. Filed July 23, 1970, Ser. No. 57,815
Claims priority, application Switzerland, Aug. 1, 1969, 11,727/69; Oct. 21, 1969, 15,708/69; Jan. 19, 1970, 674/70
Int. Cl. C07d 51/42
U.S. Cl. 260—256.4 E
9 Claims

ABSTRACT OF THE DISCLOSURE

Novel phosphoric acid amide esters of the formula:

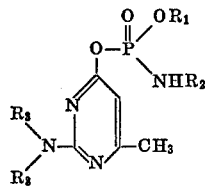

wherein $R_1$ is alkyl of 1 to 4 carbon atoms, $R_2$ is alkyl of 1 to 4 carbon atoms, $R_3$ is hydrogen or alkyl of 1 to 4 carbon atoms, and $R_4$ is hydrogen or alkyl of 1 to 4 carbon atoms, which possess pesticidal properties, or more particularly insecticidal, acaricidal and ovicidal properties.

---

The present invention relates to new phosphoric acid amide esters of Formula I,

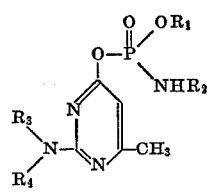

I wherein
$R_1$ is alkyl of 1 to 4 carbon atoms,
$R_2$ is alkyl of 1 to 4 carbon atoms,
$R_3$ is hydrogen or alkyl of 1 to 4 carbon atoms, and
$R_4$ is hydrogen or alkyl of 1 to 4 carbon atoms, which possess insecticidal, acaricidal and ovicidal properties, as well as a process for the production of these compounds.

The compounds of Formula I may, for example, be obtained by reacting a compound of Formula II,

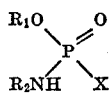

II wherein
$R_1$ and $R_2$ are as defined above, and
X is halogen, preferably chlorine, with a compound of Formula III,

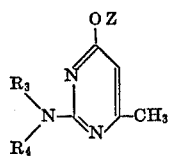

III wherein
$R_3$ and $R_4$ are as defined above, and
Z is hydrogen or a cation.

The production may be effected as follows:

A compound of Formula II, for example in an inert solvent, e.g. an aromatic hydrocarbon such as toluene or xylene, a halogenated hydrocarbon such as chlorobenzene or chloroform, a ketone such as acetone or methyl isobutyl ketone, an ether such as dioxane or tetrahydrofuran, an ester such as ethyl acetate, or a nitrile such as acetonitrile, is added at a temperature of 0° to 100° C., conveniently at room temperature, to a compound of Formula III in one of the above-indicated inert solvents. When Z in Formula III is hydrogen, it is preferable to add an acid acceptor such as triethyl amine, or optionally potash. The reaction mixture is stirred at a temperature between room temperature and the boiling temperature of the solvent and the reaction proceeds to completion within a period ranging from a few minutes to about 5 hours. The reaction product is then worked up in the usual manner. The pure compounds of Formula I are then obtained as colourless oils or crystalline products, which may be characterised, for example, by their $Rf$ value or the melting point. They are soluble in organic solvents and can be readily emulsified with water.

The compounds of Formulae II and III, required as starting materials, are known and have been described in the literature.

The compounds of Formula I are useful pesticides as indicated by their insecticidal, acaricidal and ovicidal properties. The compounds are effective against chewing and sucking insects, and also against spider mites.

The compounds of the invention have a low toxicity in warm-blooded animals and a low phytotoxicity. The new compounds are therefore indicated for use as pesticides in inhabited rooms, in cellars and attics, in stables, etc., and in protecting plants and animals against noxious organisms. The compounds of the invention may furthermore be used in veterinary medicine against mites and other parasites.

The combatting of noxious organisms may be carried out by conventional methods, e.g. by treating the objects to be protected with the active materials. For use in plant protection or as pesticides, the compounds of the invention may be used in the form of dusting or spraying agents, e.g. as solutions or dispersions, prepared with water or a suitable organic solvent, e.g. alcohol, petroleum or tar distillates, as well as an emulsifier, e.g. liquid polyglycol ethers, derived from a high molecular weight alcohol, mercaptan or alkyl phenol, and an alkylene oxide. Suitable organic solvents such as ketones, aromatic, optionally halogenated hydrocarbons, or mineral oils, may also be added to the mixture as solution aids.

Spraying and dusting agents may contain conventional carrier materials, e.g. talc, diatomaceous earth, bentonite, pumice, or other additives such as cellulose derivatives and the like, as well as the usual wetting agents and adhesives, to improve wettability and adhesiveness.

The active agents of the invention may be present in the formulations as mixtures with other known active materials. Formulations generally contain between 2 and 90 percent, preferably between 5 and 50 percent by weight of active agent. Application liquors generally contain between 0.02 and 90 percent, preferably between 0.1 and 20 percent by weight of active agent.

The compounds of Formula I, at the above-indicated concentrations in diluted formulations, e.g. with water, may be used in culturing fruit and vegetables and in other types of agriculture. The following are exemplary formulations:

(a) 25 parts by weight of a compound of Formula I are mixed with 25 parts by weight of isooctylphenyldecaglycol ether and 50 parts by weight of xylene, whereby a clear solution is obtained which may be readily emulsified in water. The concentrate is diluted with water to the desired concentration.

(b) 25 parts by weight of a compound of Formula I are mixed with 30 parts by weight of isooctylphenyloctaglycol ether and 45 parts by weight of a petroleum fraction having a boiling point of 210–280° C. ($D_{20}=0.92$). The concentrate is diluted with water to the desired concentration.

(c) 50 parts by weight of a compound of Formula I are mixed with 50 parts by weight of isooctylphenyloctaglycol ether. A clear concentrate is obtained which may be readily emulsified in water and which is diluted with water to the desired concentration.

The following application examples are illustrative of the effect of the compounds of the invention.

Insecticidal effect against *Ephestiakuehniella*
(flour moth)—contact effect

Petri dishes having a diameter of 7 cm., each containing 10 *kuehniella* caterpillars having a length of 10 to 12 mm., are sprayed by means of a spraying nozzle with 0.1 to 0.2 cc. of an emulsion containing 0.05% of the active agent of Formula I (produced by diluting the formulation (a) with water). The dishes are then covered with a lid of fine mesh brass gauze. After drying the emulsion in the wishes, a wafer is given as food and renewed as required. After five days the rate of mortality is determined as a percentage by counting out the live and deal animals. 100% means that all caterpillars were killed, 0% means that no caterpillar was killed. The evaluation is indicated in the following Table 1.

TABLE 1

| Active agent | Rate of mortality in percent after 5 days |
|---|---|
| (H$_5$C$_2$)$_2$N—pyridine(CH$_3$)—O—P(=O)(OCH$_3$)(NHn-C$_3$H$_7$) | 100 |
| (H$_5$C$_2$)$_2$N—pyridine(CH$_3$)—O—P(=O)(OCH$_3$)(NHi-C$_3$H$_7$) | 100 |
| (H$_5$C$_2$)$_2$N—pyridine(CH$_3$)—O—P(=O)(OC$_2$H$_5$)(NHC$_2$H$_5$) | 100 |
| (H$_5$C$_2$)$_2$N—pyridine(CH$_3$)—O—P(=O)(OC$_2$H$_5$)(NHn-C$_2$H$_7$) | 100 |

Insecticidal effect against *Carausius morosus*
(Indian rod locust)—feed effect

Tradescantia branches are immersed for 3 seconds in an emulsion containing 0.0125% of a compound of Formula I (produced by diluting the formulation a) with water). After drying the covering each of the Tradescantia branches is inserted into a small glass tube filled with water, and this is placed in a glass dish. 10 Carausius larvae in the second stage of development are counted into each dish which is then closed with a wire mesh lid. After 5 days the rate of mortality is determined by counting out the live and dead animals. The rate of mortality is indicated as a percentage. 100% means that all rod locusts were killed, 0% means that no rod locust was killed. The evaluation is indicated in the following Table 2.

TABLE 2

| Active agent | Rate of mortality in percent after 5 days |
|---|---|
| (H$_5$C$_2$)$_2$N—pyridine(CH$_3$)—O—P(=O)(OCH$_3$)(NHn-C$_3$H$_7$) | 100 |
| (H$_5$C$_2$)$_2$N—pyridine(CH$_3$)—O—P(=O)(OCH$_3$)(NHi-C$_3$H$_7$) | 100 |

Insecticidal effect against *Aphis fabae*
(black bean aphid)—contact effect

Broad bean plants (*Vicia faba*) are sprayed to run off with a spraying liquor containing 0.0125% of active agent (produced by diluting formulation(a) with water). The broad bean plants are strongly infected with all the forms of development of the black bean aphid (*Aphis fabae*). After 2 days the rate of mortality is determined. The mortality rate is indicated as a percentage. 100% means that all bean aphids were killed, 0% means that no bean aphid was killed. The evaluation is indicated in the following Table 3.

TABLE 3

| Active agent | Rate of mortality in percent after 48 hours |
|---|---|
| (H$_5$C$_2$)$_2$N—pyridine(CH$_3$)—O—P(=O)(OCH$_3$)(NHn-C$_3$H$_7$) | 100 |
| (H$_5$C$_2$)$_2$N—pyridine(CH$_3$)—O—P(=O)(OCH$_3$)(NHi-C$_3$H$_7$) | 100 |

Ovicidal effect against *Tetranychus telarius* (spider mite)—contact effect

Two days before treatment, 12 to 15 female Tetranychus are placed on a 2 cm. diameter ring of insect paste on a bush bean leaf, to lay eggs. The female mites lay 20 to 30 eggs in 30 hours. One day before treatment the female mites are removed and the leaves are cut off from the plants and the stems are introduced in a small glass tube filled with water. The bush bean leaves, containing 1 to 2 days old eggs, are immersed for 3 seconds in an emulsion containing 0.05% of a compound of Formula I (produced by diluting the formulation (a) with water). The leaves are kept in a dish at room temperature for 5 days. After 5 days the hatched and unhatched eggs are counted out. The evaluation (Table 4) of the ovicidal effect is indicated as a percentage. 100% means that no egg larvae are hatched.

TABLE 4

| Active agent | Rate of mortality in percent after 5 days |
|---|---|
| 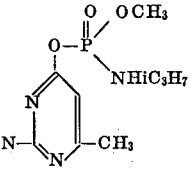 | 100 |
| 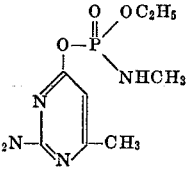 | 100 |
| 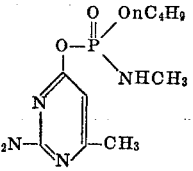 | 100 |
| 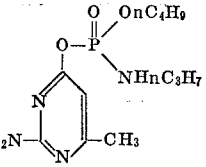 | 100 |
| 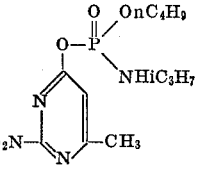 | 100 |
| 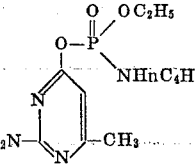 | 100 |
| 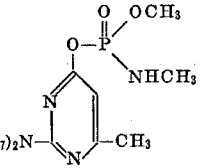 | 100 |
| 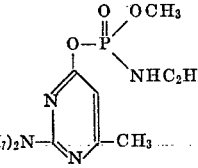 | 100 |

Acaricidal effect against *Tetranychus telarius* (spider mite)—contact effect

Leaf disks of bean plants (*Phaseolus vulgaris*), each containing 20 to 30 mites (larvae and adults), are immersed for 3 seconds in a liquor (concentration 0.0125% of active agent) and are then placed in a dish. The dish is covered with moistened filter paper at an oblique angle so that a slight aeration is possible. After 48 hours the live and dead mites are counted out under a binocular magnifying glass. The mortality is indicated as a percentage of the following Table 5.

TABLE 5

| Active agent | Rate of mortality in percent after 48 hours |
|---|---|
| 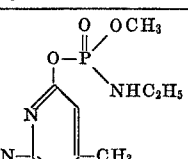 | 100 |
| 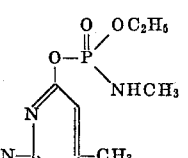 | 100 |
| 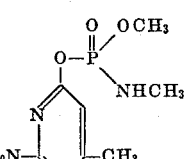 | 100 |
| 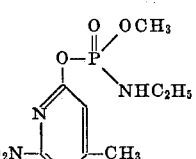 | 100 |
| 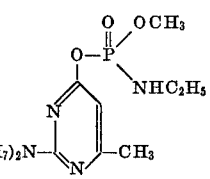 | 100 |

The following examples illustrate the production of the compounds, but in no way limit the scope of the invention. The temperatures are indicated in degrees centigrade.

EXAMPLE 1

O-ethyl-N-ethyl-O-(2-diethylamino-4-methyl-pyrimidyl-6)-phosphoroamidate

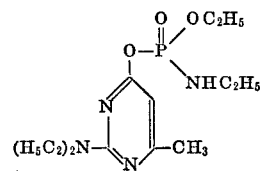

A solution of 17.16 g. (0.1 mol) of O-ethyl-N-ethyl-phosphoroamidochloride (Formula II: $R_1=C_2H_5$, $R_2=C_2H_5$, $X=Cl$) in 150 cc. of toluene is added dropwise at room temperature within 1 hour to a solution of 20.3 g. (0.1 mol) of the sodium salt of 2-diethylamino-4-methyl-6-hydroxy-pyrimidine in 100 cc. of toluene. The reaction mixture is subsequently stirred at room temperature for ½ hour, and at 60° for 3 hours. After cooling, the reaction mixture is filtered with suction, the filtrate is washed with water, the toluene solution is dried with sodium sulphate and concentrated by evaporation in a vacuum. O-ethyl-N-ethyl-O-(2-diethylamino-4-methyl-pyrimidyl-6)-phosphoroamidate is obtained as a colourless oil.

The compound is dissolved in methylene chloride and purified by chromatography on a silica gel column. Methylene chloride containing 20% ethyl acetate is used as eluant. The degree of purity is checked on a silica gel thin layer plate with chloroform/glacial acetic acid 1:1 as eluant.

*Analysis.*—$C_{13}H_{25}N_4O_3P$ (molecular weight: 316.3). Calculated (percent): C, 49.3; H, 8.0; N, 17.7; P, 9.8. Found (percent): C, 49.6; H, 8.3; N, 17.4; P, 10.0.

Rf value: 0.62 (toluene/isooctane 1:4) [Whatman paper No. 1, impregnated with 2% formamide+20% dimethyl formamide].

The following compounds of Formula I are obtained in a manner analogous to that described in Example 1, whereby the compounds which are not obtained in crystalline form are purified by subjecting them to a molecular distillation, or are obtained in pure form by dissolving them in diethyl ether or another suitable solvent, and subjecting them to chromatography over a silica gel column with diethyl ether or another suitable solvent as eluant.

In the following table (a) signifies chromatography on Whatman paper No. 1, impregnated with 2% formamide+20% dimethyl formamide in acetone, (b) signifies eluant: toluene, (c) signifies eluant: toluene/isooctane 1:1, (d) signifies eluant: toluene/isooctane 1:4, (e) signifies thin layer chromatography on silica gel $PF_{254}$ (Merck). Eluant: ether.

| Example | $R_1$ | $R_2$ | $R_3$ | $R_4$ | Empirical formula | Molecular weight | Calculated C | H | N | P | Found C | H | N | P | M.P. [°C.] | Rf (a) | $n_D^{20}$ |
|---|---|---|---|---|---|---|---|---|---|---|---|---|---|---|---|---|---|
| 2 | $CH_3$ | n-$C_3H_7$ | $C_2H_5$ | $C_2H_5$ | $C_{13}H_{25}N_4O_3P$ | 316.3 | 49.3 | 8.0 | 17.7 | 9.8 | 48.9 | 8.2 | 17.5 | 9.7 | | 0.65(d) | |
| 3 | $CH_3$ | i-$C_3H_7$ | $C_2H_5$ | $C_2H_5$ | $C_{13}H_{25}N_4O_3P$ | 316.3 | 49.3 | 8.0 | 17.7 | 9.8 | 49.0 | 7.7 | 17.2 | 10.1 | | 0.65(c) | |
| 4 | $C_2H_5$ | n-$C_3H_7$ | $C_2H_5$ | $C_2H_5$ | $C_{14}H_{27}N_4O_3P$ | 330.4 | 51.0 | 8.2 | 17.0 | 9.4 | 50.6 | 8.1 | 16.6 | 9.5 | | 0.78(d) | |
| 5 | $C_2H_5$ | i-$C_3H_7$ | $C_2H_5$ | $C_2H_5$ | $C_{14}H_{27}N_4O_3P$ | 330.4 | 51.0 | 8.2 | 17.0 | 9.4 | 51.2 | 8.3 | 16.8 | 9.5 | | 0.77(d) | |
| 6 | $CH_3$ | $CH_3$ | $C_2H_5$ | $C_2H_5$ | $C_{11}H_{21}N_4O_3P$ | 288.3 | 45.8 | 7.3 | 19.5 | 10.7 | 46.1 | 7.5 | 20.0 | 10.4 | 90-91 | 0.60(c) | |
| 7 | $CH_3$ | $C_2H_5$ | $C_2H_5$ | $C_2H_5$ | $C_{12}H_{23}N_4O_3P$ | 302.1 | 47.7 | 7.7 | 18.5 | 10.2 | 47.4 | 7.6 | 18.2 | 9.9 | | 0.45(d) | |

| Example | $R_1$ | $R_2$ | $R_3$ | $R_4$ | Empirical formula | Molecular weight | Calculated C | H | N | P | Found C | H | N | P | M.P. [°C.] | Rf (e) | $n_D^{25}$ |
|---|---|---|---|---|---|---|---|---|---|---|---|---|---|---|---|---|---|
| 8 | n$C_3H_7$ | $CH_3$ | $C_2H_5$ | $C_2H_5$ | $C_{13}H_{25}N_4O_3P$ | 316.3 | 49.4 | 8.0 | 17.7 | 9.8 | 49.0 | 8.2 | 17.9 | 10.1 | | 0.22 | 1.5075 |
| 9 | n$C_3H_7$ | $C_2H_5$ | $C_2H_5$ | $C_2H_5$ | $C_{14}H_{27}N_4O_3P$ | 330.4 | 50.9 | 8.2 | 17.0 | 9.4 | 51.4 | 8.5 | 17.1 | 9.4 | | 0.28 | 1.5036 |
| 10 | n$C_3H_7$ | n$C_3H_7$ | $C_2H_5$ | $C_2H_5$ | $C_{15}H_{29}N_4O_3P$ | 344.4 | 52.3 | 8.5 | 16.3 | 9.0 | 52.6 | 8.2 | 16.0 | 9.0 | | 0.32 | 1.5002 |
| 11 | n$C_3H_7$ | i$C_3H_7$ | $C_2H_5$ | $C_2H_5$ | $C_{15}H_{29}N_4O_3P$ | 344.4 | 52.3 | 8.5 | 16.3 | 9.0 | 51.6 | 8.5 | 16.2 | 9.6 | | 0.33 | 1.4974 |
| 12 | n$C_4H_9$ | $CH_3$ | $C_2H_5$ | $C_2H_5$ | $C_{14}H_{27}N_4O_3P$ | 330.4 | 50.9 | 8.2 | 17.0 | 9.4 | 50.7 | 7.9 | 17.2 | 9.5 | | 0.25 | 1.5012 |
| 13 | n$C_4H_9$ | $C_2H_5$ | $C_2H_5$ | $C_2H_5$ | $C_{15}H_{29}N_4O_3P$ | 344.4 | 52.3 | 8.5 | 16.3 | 9.0 | 52.1 | 8.9 | 16.3 | 9.2 | | 0.31 | 1.4992 |
| 14 | n$C_4H_9$ | n$C_3H_7$ | $C_2H_5$ | $C_2H_5$ | $C_{16}H_{31}N_4O_3P$ | 358.4 | 53.6 | 8.7 | 15.6 | 8.6 | 53.9 | 8.9 | 15.4 | 9.3 | | 0.36 | 1.4980 |
| 15 | n$C_4H_9$ | i$C_3H_7$ | $C_2H_5$ | $C_2H_5$ | $C_{16}H_{31}N_4O_3P$ | 358.4 | 53.6 | 8.7 | 15.6 | 8.6 | 53.2 | 8.8 | 15.0 | 9.0 | | 0.37 | 1.4942 |
| 16 | $C_2H_5$ | $CH_3$ | $C_2H_5$ | $C_2H_5$ | $C_{12}H_{23}N_4O_3P$ | 302.3 | 47.7 | 7.7 | 18.5 | 10.2 | 47.6 | 7.6 | 18.5 | 10.1 | 40.5-41.5 | | |
| 17 | $C_2H_5$ | n$C_4H_9$ | $C_2H_5$ | $C_2H_5$ | $C_{15}H_{29}N_4O_3P$ | 344.4 | 52.3 | 8.5 | 16.3 | 9.0 | 52.7 | 8.5 | 16.1 | 9.6 | | 0.29 | 1.5003 |
| 18 | $CH_3$ | $CH_3$ | $CH_3$ | $CH_3$ | $C_9H_{17}N_4O_3P$ | 260.2 | 41.5 | 6.6 | 21.5 | 11.9 | 41.1 | 6.7 | 21.7 | 11.6 | 102-3 | | |
| 19 | $CH_3$ | $C_2H_5$ | $CH_3$ | $CH_3$ | $C_{10}H_{19}N_4O_3P$ | 274.3 | 43.8 | 7.0 | 20.4 | 11.3 | 43.9 | 7.3 | 20.0 | 11.8 | | 0.10 | 1.5185 |
| 20 | $CH_3$ | n$C_3H_7$ | $CH_3$ | $CH_3$ | $C_{11}H_{21}N_4O_3P$ | 288.3 | 45.8 | 7.3 | 19.4 | 10.7 | 45.9 | 7.3 | 19.0 | 9.8 | | 0.11 | 1.5160 |
| 21 | $C_2H_5$ | $CH_3$ | $CH_3$ | $CH_3$ | $C_{10}H_{19}N_4O_3P$ | 274.3 | 43.8 | 7.0 | 20.4 | 11.3 | 43.8 | 7.3 | 20.2 | 10.7 | 69-70 | | |
| 22 | $C_2H_5$ | i$C_3H_7$ | $CH_3$ | $CH_3$ | $C_{12}H_{23}N_4O_3P$ | 302.3 | 47.7 | 7.7 | 18.5 | 10.2 | 46.9 | 7.8 | 18.1 | 10.0 | 84-5 | | |
| 23 | $C_2H_5$ | $C_2H_5$ | $CH_3$ | $CH_3$ | $C_{11}H_{21}N_4O_3P$ | 288.3 | 45.8 | 7.3 | 19.4 | 10.7 | 46.1 | 7.6 | 19.2 | 11.1 | 51-2 | | |
| 24 | $C_2H_5$ | n$C_3H_7$ | $CH_3$ | $CH_3$ | $C_{12}H_{23}N_4O_3P$ | 302.3 | 47.7 | 7.7 | 18.5 | 10.2 | 47.5 | 7.8 | 17.8 | 10.6 | 55-7 | | |
| 25 | n$C_3H_7$ | $CH_3$ | $CH_3$ | $CH_3$ | $C_{11}H_{21}N_4O_3P$ | 288.3 | 45.8 | 7.3 | 19.4 | 10.7 | 45.9 | 7.4 | 19.2 | 11.2 | 67-8 | | |
| 26 | n$C_3H_7$ | i$C_3H_7$ | $CH_3$ | $CH_3$ | $C_{13}H_{25}N_4O_3P$ | 316.3 | 49.4 | 8.0 | 17.7 | 9.8 | 48.9 | 7.9 | 17.4 | 10.1 | 74-5 | | |

| Ex. | $R_1$ | $R_2$ | $R_3$ | $R_4$ | Empirical formula | Molecular weight | Calculated C | H | N | P | Found C | H | N | P | $n_D^{20}$ |
|---|---|---|---|---|---|---|---|---|---|---|---|---|---|---|---|
| 27 | $CH_3$ | n-$C_4H_9$ | n-$C_3H_7$ | n-$C_3H_7$ | $C_{16}H_{31}N_4O_3P$ | 358.4 | 53.6 | 8.7 | 15.6 | 8.6 | 53.8 | 8.8 | 15.7 | 8.4 | 1.5042 |
| 28 | $CH_3$ | $CH_3$ | n-$C_3H_7$ | n-$C_3H_7$ | $C_{13}H_{25}N_4O_3P$ | 316.3 | 49.4 | 8.0 | 17.7 | 9.8 | 49.5 | 8.2 | 17.7 | 9.6 | 1.5089 |
| 29 | $CH_3$ | $C_2H_5$ | n-$C_3H_7$ | n-$C_3H_7$ | $C_{14}H_{27}N_4O_3P$ | 330.4 | 50.9 | 8.2 | 17.0 | 9.4 | 50.9 | 8.3 | 17.1 | 9.2 | 1.5058 |
| 30 | $C_2H_5$ | n-$C_3H_7$ | n-$C_3H_7$ | n-$C_3H_7$ | $C_{16}H_{31}N_4O_3P$ | 358.4 | 53.6 | 8.7 | 15.6 | 8.6 | 53.5 | 8.8 | 15.8 | 8.5 | 1.5025 |
| 31 | $C_2H_5$ | i-$C_3H_7$ | n-$C_3H_7$ | n-$C_3H_7$ | $C_{16}H_{31}N_4O_3P$ | 358.4 | 53.6 | 8.7 | 15.6 | 8.6 | 53.5 | 8.9 | 15.7 | 8.8 | |
| 32 | $CH_3$ | i-$C_3H_7$ | n-$C_3H_7$ | n-$C_3H_7$ | $C_{15}H_{29}N_4O_3P$ | 344.4 | 52.3 | 8.5 | 16.3 | 9.0 | 52.5 | 8.6 | 16.5 | 8.8 | 1.5028 |
| 33 | $CH_3$ | n-$C_3H_7$ | n-$C_3H_7$ | n-$C_3H_7$ | $C_{15}H_{29}N_4O_3P$ | 344.4 | 52.3 | 8.5 | 16.3 | 9.0 | 52.2 | 8.8 | 16.4 | 9.0 | 175043 |
| 34 | $C_2H_5$ | $C_2H_5$ | n-$C_3H_7$ | n-$C_3H_7$ | $C_{14}H_{27}N_4O_3P$ | 330.4 | 50.9 | 8.2 | 17.0 | 9.4 | 51.2 | 8.5 | 16.7 | 9.1 | 1.5008 |
| 35 | $C_2H_5$ | $C_2H_5$ | n-$C_3H_7$ | n-$C_3H_7$ | $C_{15}H_{29}N_4O_3P$ | 344.4 | 52.3 | 8.5 | 16.3 | 9.0 | 52.6 | 8.9 | 16.1 | 8.7 | 1.5017 |
| 36 | $C_2H_5$ | n-$C_4H_9$ | n-$C_3H_7$ | n-$C_3H_7$ | $C_{17}H_{33}N_4O_3P$ | 372.5 | 54.8 | 8.9 | 15.0 | 8.3 | 55.1 | 9.0 | 15.3 | 8.1 | 1.5015 |
| 37 | i-$C_3H_7$ | $CH_3$ | n-$C_3H_7$ | n-$C_3H_7$ | $C_{15}H_{29}N_4O_3P$ | 344.4 | 52.3 | 8.5 | 16.3 | 9.0 | 52.7 | 8.8 | 16.1 | 9.2 | 1.4934 |
| 38 | i-$C_3H_7$ | $C_2H_5$ | n-$C_3H_7$ | n-$C_3H_7$ | $C_{16}H_{31}N_4O_3P$ | 358.4 | 53.6 | 8.7 | 15.6 | 8.6 | 54.0 | 8.8 | 15.8 | 8.5 | 1.4999 |
| 39 | i-$C_3H_7$ | n-$C_3H_7$ | n-$C_3H_7$ | n-$C_3H_7$ | $C_{17}H_{33}N_4O_3P$ | 372.5 | 54.8 | 8.9 | 15.0 | 8.3 | 55.4 | 9.2 | 14.8 | 8.1 | 1.4981 |
| 40 | i-$C_3H_7$ | i-$C_3H_7$ | n-$C_3H_7$ | n-$C_3H_7$ | $C_{17}H_{33}N_4O_3P$ | 372.5 | 54.8 | 8.9 | 15.0 | 8.3 | 55.3 | 8.8 | 14.9 | 8.1 | Fp:53° |
| 41 | i-$C_3H_7$ | n-$C_4H_9$ | n-$C_3H_7$ | n-$C_3H_7$ | $C_{18}H_{35}N_4O_3P$ | 386.5 | 55.9 | 9.1 | 14.5 | 8.0 | 55.5 | 9.5 | 14.4 | 7.8 | 1.4982 |

| Example | $R_1$ | $R_2$ | $R_3$ | $R_4$ | Empirical formula | Molecular weight | Calculated C | H | N | S | Found C | H | N | S | M.P. or $n_D^{20}$ |
|---|---|---|---|---|---|---|---|---|---|---|---|---|---|---|---|
| 42 | i-$C_3H_7$ | $CH_3$ | $CH_3$ | $CH_3$ | $C_{11}H_{21}N_4O_3P$ | 288.3 | 45.8 | 7.3 | 19.4 | 10.7 | 46.2 | 7.4 | 19.7 | 10.2 | M.P. 68-70° |
| 43 | i-$C_3H_7$ | $C_2H_5$ | $C_2H_5$ | $C_2H_5$ | $C_{14}H_{27}N_4O_3P$ | 330.4 | 50.9 | 8.2 | 17.0 | 9.4 | 51.0 | 8.3 | 17.6 | 9.6 | $n_D^{20}$:1.5010 |
| 44 | i-$C_3H_7$ | i-$C_3H_7$ | $C_2H_5$ | $C_2H_5$ | $C_{15}H_{29}N_4O_3P$ | 344.4 | 52.3 | 8.5 | 16.3 | 9.0 | 52.9 | 8.6 | 16.2 | 8.9 | $n_D^{20}$:1.4959 |
| 45 | i-$C_3H_7$ | $CH_3$ | $C_2H_5$ | $C_2H_5$ | $C_{13}H_{25}N_4O_3P$ | 316.3 | 49.4 | 8.0 | 17.7 | 9.8 | 49.4 | 8.2 | 18.4 | 9.6 | $n_D^{20}$:1.5045 |
| 46 | $CH_3$ | $CH_3$ | H | $CH_3$ | $C_8H_{15}N_4O_3P$ | 246.2 | 39.0 | 6.1 | 22.8 | 12.6 | 39.4 | 6.3 | 22.8 | 12.1 | M.P. 93-95° |
| 47 | $C_2H_5$ | $CH_3$ | H | $CH_3$ | $C_9H_{17}N_4O_3P$ | 260.2 | 41.5 | 6.6 | 21.5 | 11.9 | 42.1 | 6.9 | 20.6 | 11.2 | M.P. 123-125° (from ether). |
| 48 | $CH_3$ | i-$C_3H_7$ | $CH_3$ | $CH_3$ | $C_{11}H_{21}N_4O_3P$ | 288.3 | 45.8 | 7.3 | 19.4 | 10.7 | 46.1 | 7.5 | 18.9 | 10.5 | M.P. 54-56° |

What is claimed is:
1. A compound of the formula:

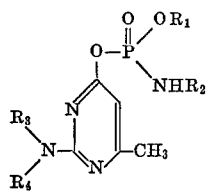

wherein $R_1$ is alkyl of 1 to 4 carbon atoms, $R_2$ is alkyl of 1 to 4 carbon atoms, $R_3$ is hydrogen or alkyl of 1 to 4 carbon atoms, and $R_4$ is hydrogen or alkyl of 1 to 4 carbon atoms.

2. The compound of claim 1, wherein each of $R_1$, $R_2$, $R_3$ and $R_4$ are methyl.

3. The compound of claim 1, wherein $R_1$ and $R_2$ are methyl and $R_3$ and $R_4$ are ethyl.

4. The compound of claim 1, wherein $R_1$ and $R_2$ are ethyl and $R_3$ and $R_4$ are n-propyl.

5. The compound of claim 1, wherein $R_1$, $R_2$, $R_3$ and $R_4$ are ethyl.

6. The compound of claim 1, wherein each of $R_1$, $R_3$ and $R_4$ are ethyl, and $R_2$ is methyl.

7. The compound of claim 1, wherein $R_1$ is methyl, and each of $R_2$, $R_3$ and $R_4$ are ethyl.

8. The compound of claim 1, wherein $R_1$ is ethyl, $R_2$ is isopropyl, and $R_3$ and $R_4$ are n-propyl.

9. The compound of claim 1, wherein $R_1$ and $R_2$ are methyl, and $R_3$ and $R_4$ are n-propyl.

References Cited
FOREIGN PATENTS
1,129,563  10/1968  Great Britain.

ALEX MAZEL, Primary Examiner
R. V. RUSH, Assistant Examiner

U.S. Cl. X.R.
260—256.4 C; 424—251

UNITED STATES PATENT OFFICE
CERTIFICATE OF CORRECTION

Patent No. 3,663,544          Dated May 16, 1972

Inventor(s) Karlheinz Milzner and Fritz Reisser

It is certified that error appears in the above-identified patent and that said Letters Patent are hereby corrected as shown below:

Assignee: Sandoz Ltd.
          Basel, Switzerland

Column 3 line 15    the word "Ephestiakuehniella" should read -- Ephestia Kuehniella --.

Column 3 line 25    the word "wishes" should read -- dishes --.

Column 3 line 28    the word "deal" should read -- dead --.

Column 3 line 50    that portion of the third formula of Table 1 reading $OC_2H_3$ should read $OC_2H_5$.

Column 3 line 57    that portion of the fourth formula of Table 1 reading $OC_2H_3$ should read $OC_2H_5$.

Signed and sealed this 18th day of December 1973.

(SEAL)
Attest:

EDWARD M. FLETCHER, JR.      RENE D. TEGTMEYER
Attesting Officer                 Acting Commissioner of Patents